No. 780,949. PATENTED JAN. 24, 1905.
E. HUBER.
CARBURETER FOR HYDROCARBON ENGINES.
APPLICATION FILED JULY 8, 1903.

2 SHEETS—SHEET 1.

WITNESSES
INVENTOR
Emil Huber
By Parker & Burton
Attorneys.

No. 780,949.

Patented January 24, 1905.

UNITED STATES PATENT OFFICE.

EMIL HUBER, OF DETROIT, MICHIGAN, ASSIGNOR OF TWO-THIRDS TO HENRI G. IDE, OF OXFORD, MICHIGAN, AND EDMUND SPRUNG, OF DETROIT, MICHIGAN.

CARBURETER FOR HYDROCARBON-ENGINES.

SPECIFICATION forming part of Letters Patent No. 780,949, dated January 24, 1905.

Application filed July 8, 1903. Serial No. 164,654.

*To all whom it may concern:*

Be it known that I, EMIL HUBER, a citizen of the United States, residing at Detroit, county of Wayne, State of Michigan, have invented a certain new and useful Improvement in Carbureters for Hydrocarbon-Engines; and I declare the following to be a full, clear, and exact description of the invention, such as will enable others skilled in the art to which it pertains to make and use the same, reference being had to the accompanying drawings, which form a part of this specification.

My invention relates to carbureters for gasolene-engines; and the object of my improvements is to provide an improved carbureter which shall deliver gasolene in proportion to the amount of air taken in by the engine and thoroughly vaporize and mix the same. I accomplish this object in the device illustrated in the accompanying drawings, in which—

Figure 1:
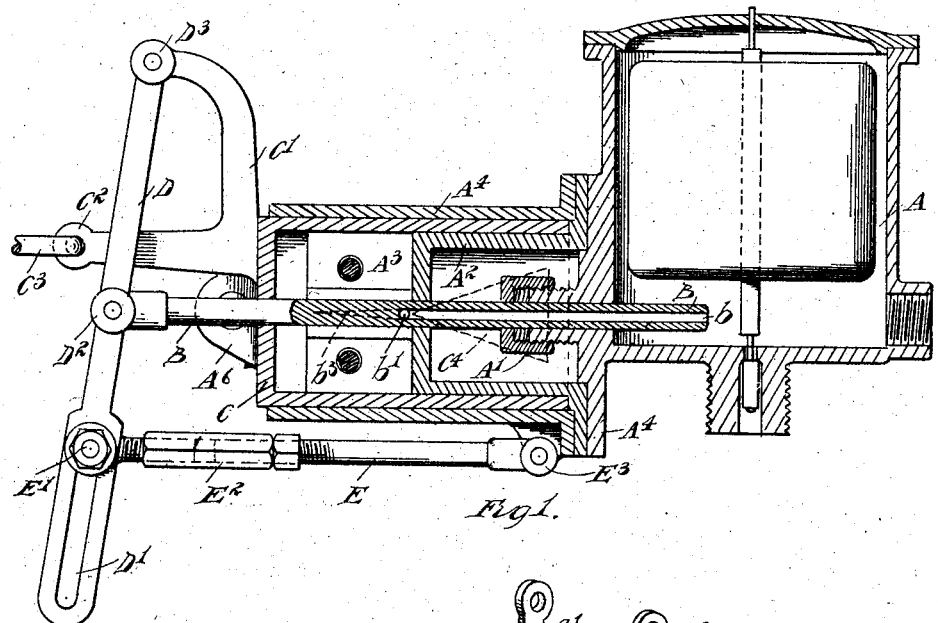
Figure 2:
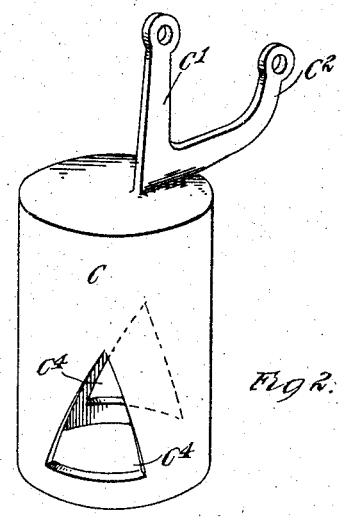
Figure 3:
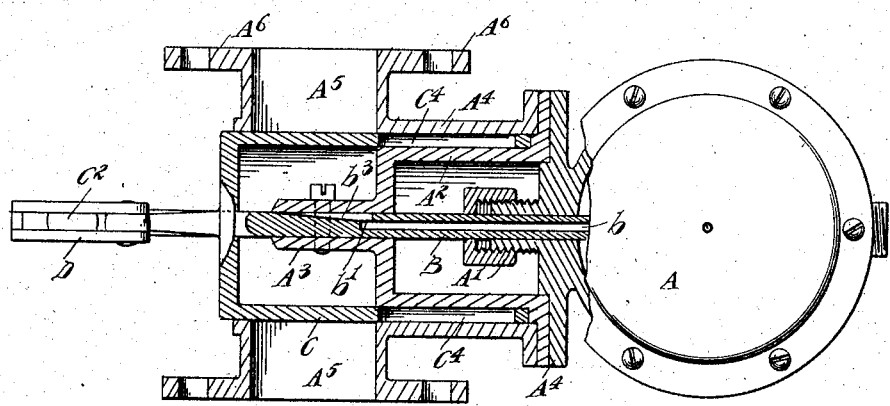
Figure 5:
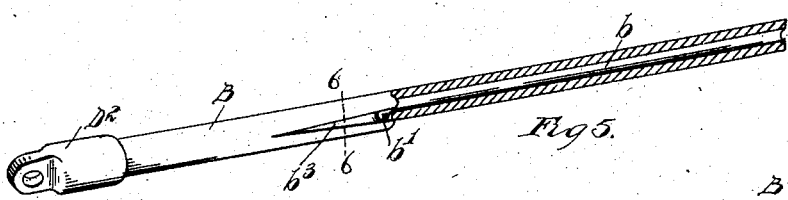
Figure 6:
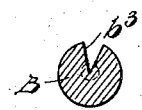
Figure 4:
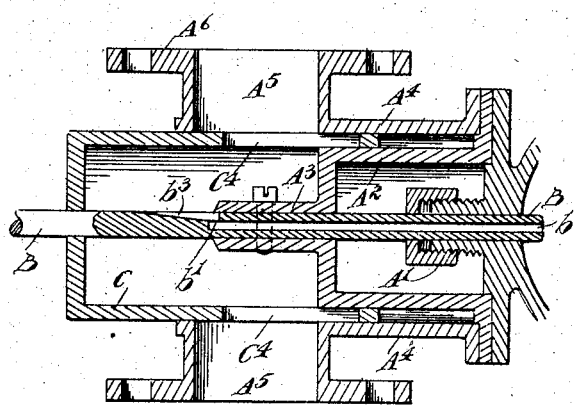

Figure 1 is a section of the carbureter embodying my invention. Fig. 2 is a detail of the throttle-valve disconnected from its casing. Fig. 3 is a section at right angles to the section of Fig. 1. Fig. 4 is a section similar to Fig. 3, showing the parts in a different relative position. Fig. 5 is a detail perspective view of the rod forming the valve which regulates the delivery of the liquid gasolene. Fig. 6 is a cross-section at the line 6 6, Fig. 5.

Similar letters refer to similar parts.

A is a gasolene-reservoir of a usual type, in which the inflow of gasolene is regulated by a float-actuated valve.

In the side of the reservoir A, near the bottom of the same, is an opening through which passes a rod B, so as to slide therein longitudinally of said rod.

$A'$ is a gland or stuffing-box surrounding the rod B.

$A^2$ is a cylindrical casing secured to the reservoir A, concentric with the stuffing-box $A'$ and projecting outward from the outer wall of said reservoir.

$A^3$ is a fin or projection from the outer end of the casing $A^2$. The rod B passes with a close fit through an aperture in the outer end of the casing $A^2$ and in the fin $A^3$.

$A^4$ is a second casing secured to the reservoir A, having a cylindrical part concentric with the casing $A^2$ and spaced therefrom. The casing $A^4$ is adapted to be secured to the engine by the usual flanges $A^6$ or otherwise, so that the transverse passage $A^5$ in said casing shall form a part of the intake-passage of the engine.

C is a hollow cylindrical throttle-valve adapted to fit closely over the casing $A^2$ and within the cylindrical part of the casing $A^4$, so as to fill the space between said casings.

$C^4$ $C^4$ are triangular apertures formed opposite each other in the cylindrical walls of the throttle-valve C at that part of said walls which comes between the casings $A^2$ $A^4$ when the throttle-valve C is in its innermost position.

$C'$ is a bracket on the outer end of the throttle-valve C.

$C^3$ is a draft-rod connected at $C^2$ to a portion of the bracket $C'$, and this rod is intended to extend to the operating-handle of the throttle-valve, and by this rod the throttle-valve is drawn out or pushed in at the will of the operator.

D is a lever pivoted at $D^3$ to the bracket $C'$ at $D^2$, to the outer end of the rod B, and at $E'$ to a swinging link E, which is pivoted at $E^3$ to the casing $A^4$.

$E^2$ is a turnbuckle by which the length of the swinging link E may be adjusted.

$D'$ is a slot in the lever D, into which the pivot $E'$, between the swinging link E and said lever, engages. The pivot $E'$ may be adjusted longitudinally in the slot $D'$, so as to alter the relative lengths of the lever-arms from said pivot to the pivot $D^2$ and to the pivot $D^3$.

$b$ is an aperture formed within the circumference of the rod B and extending from the inner end of said rod to that portion which comes at the outer end of the casing $A^2$ and at the inner end of the fin or projection $A^3$.

$b'$ is a laterally-extending aperture leading from $b$ to the circumference of the rod B.

$b^3$ is a triangular groove cut in the surface of the rod B and connected with the aperture $b'$. The groove $b^3$ (see Figs. 5 and 6) extends with its length parallel to the axis of the rod B and is triangular in both directions, as indicated in Figs. 5 and 6.

When the throttle-valve C is in place, as indicated in Figs. 1, 3, and 4, the fin $A^4$ forms a partition extending diametrically across the cavity of said valve. When the rod B is in its innermost position, the groove $b^3$ is entirely within the aperture in the fin $A^3$.

It will be observed that the throttle-valve C and rod B are so connected that when the throttle-valve is moved the rod B is moved proportionately and in the same direction. When the throttle-valve C is in its innermost position, the apertures $C^4$ $C^4$ are between the casings $A^2$ $A^4$, and the passage $A^5$ is completely closed by the walls of said throttle-valve. As the valve C is drawn outward the apertures $C^4$ $C^4$ gradually come with their smaller ends in advance into the passage $A^5$, thus opening a passage for the air through the passage $A^5$ and the apertures $C^4$ $C^4$, as indicated in Fig. 4. In proportion as the throttle-valve C is drawn out and opens the passage $A^5$ the triangular groove $b^3$ is drawn out from the apertures in the fin $A^3$, and the projecting portion of the walls of said groove are interposed directly in the path of the air passing through the passage $A^5$. The gasolene from the reservoir A runs by gravity through the aperture $b$ and into the groove $b^3$ and spreads out upon the exposed portion of the walls of said groove, where it is readily vaporized and its vapor taken up by the air being drawn through the passage $A^5$ into the engine.

What I desire to claim is—

1. In a carbureter, the combination of a reservoir for containing gasolene, a rod provided with a longitudinally-extending groove in its side communicating with the gasolene in the reservoir, and a wall inclosing a part of said rod and adapted to cover said groove at one position of the rod, said rod being adapted to be moved longitudinally to bring a greater or less part of said groove outside of said walls.

2. In a carbureter, the combination of a reservoir for containing gasolene, a rod provided with a longitudinally-extending groove of a cuniform shape in plan in its side communicating with the gasolene in the reservoir, and a wall inclosing a part of said rod and adapted to cover said groove at one position of the rod, said rod being adapted to be moved longitudinally to bring a greater or less part of said groove outside of said walls.

3. In a carbureter, the combination of a reservoir for containing gasolene, a rod provided with a longitudinally-extending groove in its side toward one end and a longitudinally-extending aperture wholly within said rod communicating with said groove and with said reservoir, said rod passing through an aperture in the wall of said reservoir beyond said groove so as to slide therein, and a wall inclosing a part of said rod and adapted to cover said groove at one position of the rod, said rod being adapted to be moved longitudinally to bring a greater or less part of said groove outside of said wall.

4. In a carbureter, the combination of a mixing-chamber, a fin forming a partition extending part way across said chamber, an inlet for air opposite the base of said fin upon one side thereof, and an outlet for air opposite the base of and on the opposite side of said fin, and means for supplying gasolene at the outer edge of said fin.

5. In a carbureter, the combination of a fuel-chamber, a perforated longitudinal valve leading therefrom and slidably engaging an appropriate valve-seat, said perforation terminating in a groove whereby the amount that said valve is opened is regulated, a carbureting-chamber into which said valve leads, said carbureting-chamber being inclosed within the walls of a throttle-valve, the space between said walls forming a chamber, openings upon either side of said throttle-valve, a circumferential recess within which said throttle-valve is slidably engaged and adapted to entirely cover said openings, or from which said valve may be withdrawn sufficiently to variably control said openings, an air-passage leading to one of said openings in said throttle-valve and adapted to be cut off thereby, another passage leading from the opposite opening in said throttle-valve and which is adapted also to be cut off by the longitudinal action of said throttle-valve, and means for operating said valves simultaneously, substantially as described.

6. In a carbureter, the combination of a mixing-chamber, a fin forming a partition extending part way across said chamber, a rod extending through an aperture in said partition and adapted to be protruded from said partition, a groove in the surface of said rod at the side thereof, adapted to be drawn within or protruded from said partition, and an inlet for air upon one side of said partition opposite the base thereof.

7. In a carbureter, a mixing-chamber, an opening for air leading into said chamber, an opening leading from said chamber, a passage for gasolene leading into said chamber, a slide adapted to adjust the cross-section of the opening leading into said chamber, and a slide adapted to adjust the cross-section of the opening leading from said chamber, said slides being connected together, means for adjusting the passage for gasolene, and means for simultaneously moving said slides and said adjusting means.

8. In a carbureter, the combination of a gas-passage, a cylindrical chamber intersect ing said passage, a hollow cylinder fitted and adapted to slide longitudinally in said chamber, said hollow cylinder being provided with opposite apertures in its shell adapted to register to a variable extent with the inlet and outlet passages of said chamber, a gasolene-passage opening into said chamber, a valve controlling said gasolene-passage, and means connecting said cylinder and valve so that their movements shall be proportional.

In testimony whereof I sign this specification in the presence of two witnesses.

EMIL HUBER.

Witnesses:
MARSDEN C. BURCH,
NETTIE V. BELLES.